(12) United States Patent
Jaber et al.

(10) Patent No.: US 9,630,707 B2
(45) Date of Patent: Apr. 25, 2017

(54) METHOD FOR MANAGING AN ELECTRIC MOTOR

(71) Applicant: MESSIER-BUGATTI-DOWTY, Velizy-Villacoublay (FR)

(72) Inventors: Sylvain Jaber, Velizy-Villacoublay (FR); Raffi Cekic, Velizy-Villacoublay (FR)

(73) Assignee: MESSIER-BUGATTI-DOWTY, Vélizy-Villacoublay (FR)

( * ) Notice: Subject to any disclaimer, the term of this patent is extended or adjusted under 35 U.S.C. 154(b) by 6 days.

(21) Appl. No.: 14/746,953

(22) Filed: Jun. 23, 2015

(65) Prior Publication Data

US 2015/0375855 A1 Dec. 31, 2015

(30) Foreign Application Priority Data

Jun. 25, 2014 (FR) ..................................... 14 55930

(51) Int. Cl.
| | | |
|---|---|---|
| *H03K 5/00* | (2006.01) | |
| *B64C 25/40* | (2006.01) | |
| *H02P 9/00* | (2006.01) | |
| *H02P 3/22* | (2006.01) | |
| *H02P 3/12* | (2006.01) | |

(52) U.S. Cl.
CPC .............. *B64C 25/405* (2013.01); *H02P 3/22* (2013.01); *H02P 9/008* (2013.01); *H02P 3/12* (2013.01); *Y02T 50/823* (2013.01)

(58) Field of Classification Search
CPC ... B64C 2201/042; B64C 25/405; H02P 3/22; H02P 3/12
See application file for complete search history.

(56) References Cited

U.S. PATENT DOCUMENTS 3,769,710 A * 11/1973 Reister ................. G01C 21/165
                                                    244/175
2009/0230897 A1    9/2009 Conen
2012/0091257 A1*  4/2012 Wolff .................. B64C 29/0033
                                                    244/12.4
2014/0132190 A1   5/2014 Kitano
2014/0156130 A1   6/2014 Ogawa et al.

FOREIGN PATENT DOCUMENTS

| EP | 1 911 146 | 4/2008 |
| EP | 2 733 843 A1 | 5/2014 |
| WO | 2007/012358 A1 | 2/2007 |

OTHER PUBLICATIONS

French Search Report for corresponding FR 1455930 dated Apr. 23, 2015.

* cited by examiner

*Primary Examiner* — Karen Masih
(74) *Attorney, Agent, or Firm* — Sughrue Mion, PLLC

(57) ABSTRACT

The invention relates to a method for managing an electric motor (6) intended to drive rotationally a wheel (4) of an aircraft (1), the method comprising the step of short-circuiting the phases of the electric motor (6) when the aircraft (1) is in a period of deactivation of the motor (6) during which it is envisaged not using the electric motor (6).

5 Claims, 3 Drawing Sheets

METHOD FOR MANAGING AN ELECTRIC MOTOR

The invention relates to a method for managing an electric motor intended to drive rotationally an aircraft wheel. This method allows the electric motor to be protected again the electromotive force which arises when the motor is deactivated and the aircraft is moving along the ground at high speed.

BACKGROUND OF THE INVENTION

In order to ensure fuel savings and reduce the noise and pollution produced by operation of the jet engines on the ground, it has been proposed performing displacement of an aircraft in an airport zone without the aid of the jet engines, by motorising certain wheels of the aircraft.

Motorisation of the aircraft wheels generally employs, for each motorised wheel of the aircraft, an electric motor which is intended to drive the wheel rotationally.

When the electric motor is not used to drive the aircraft wheel and the aircraft is moving on the ground, the rotor of the electric motor is rotationally driven by rotation of the wheel, this generating a certain electromotive force between the phases of the electric motor. When the speed of the aircraft on the ground is high, in particular during the take-off and landing phases, this electromotive force increases significantly and risks damaging the electric motor. A clutch device is therefore used to disconnect mechanically the electric motor from the wheel during these phases. This type of device is generally relatively heavy and complex owing to the high torque levels to be transmitted and the reliability required.

OBJECT OF THE INVENTION

The object of the invention is to protect against the abovementioned electromotive force an electric motor intended to drive rotationally an aircraft wheel, while reducing the increase in the weight of the aircraft resulting from implementation of this protection.

SUMMARY OF THE INVENTION

In the light of this object, a method for managing an electric motor intended to drive rotationally an aircraft wheel is provided, the method comprising the step of short-circuiting the phases of the electric motor when the aircraft is in a period of deactivation of the motor during which it is envisaged not using the electric motor.

By short-circuiting the phases of the electric motor when the aircraft is in the deactivation period, it is possible to prevent the formation of an electromotive force which, when the ground speed of the aircraft is high, risks damaging the electric motor. Short-circuiting of the phases of the electric motor may be performed by means of—electric or electromechanical—switches whose use results in an increase in the weight of the aircraft which is markedly less than that resulting from the use of conventional mechanical clutch devices.

BRIEF DESCRIPTION OF THE DRAWINGS

The invention will be understood more clearly in the light of the description below with reference to the figures of the attached drawings in which.

DETAILED DESCRIPTION OF THE INVENTION

Figure 1:
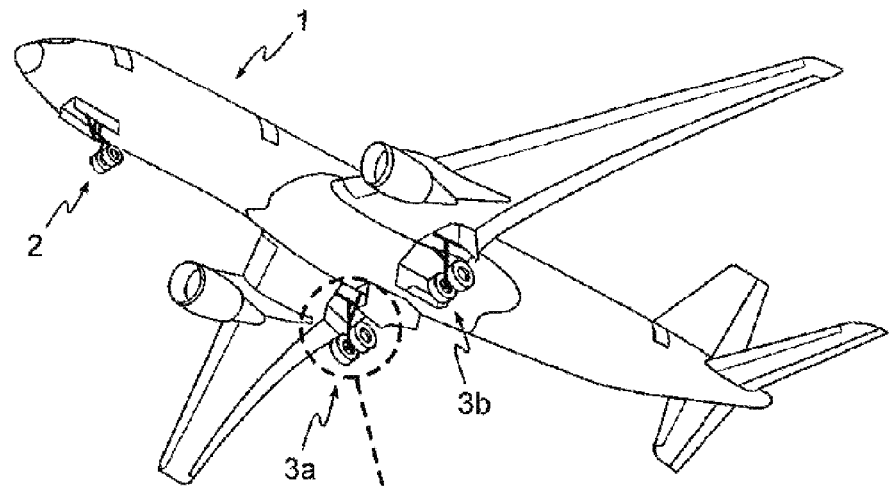
FIG. 1 shows an aircraft as well as a detailed view of the aircraft showing a main landing gear comprising two wheels adapted to be rotationally driven by the electric motors to which the management method according to the invention is applied.
Figure 1:
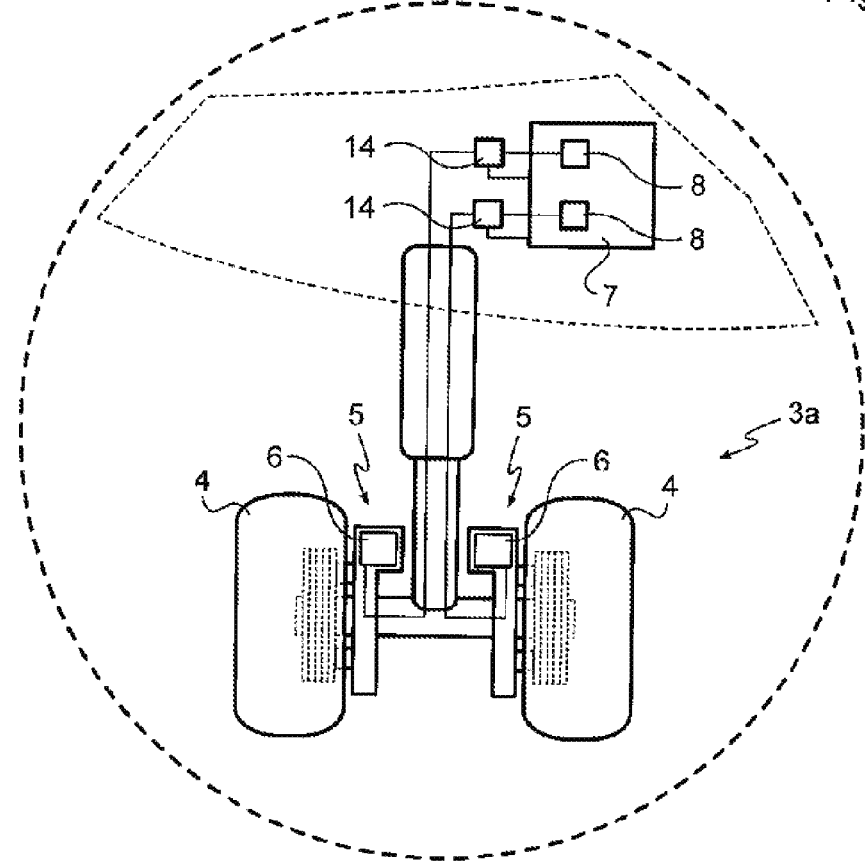

With reference to FIG. 1, the invention is applied here to an aircraft 1 comprising an auxiliary landing gear 2 and two main landings gears 3a, 3b.

The invention is described with reference solely to the main landing gear 3a, the whole of this description being applicable to the other main landing gear 3b.

The main landing gear 3a is provided with two wheels 4. Means 5 for rotationally driving the wheels 4 are mounted on the main landing gear 3a. These driving means 5, which are shown schematically in FIG. 1, comprise for each wheel 4 a driving actuator comprising an electric motor 6 intended to drive the wheel 4 rotationally.

The electric motors 6 are permanent-magnet three-phase synchronous electric motors.

The electric motors 6 are controlled by a control processor 7 associated with the two wheels 4 of the main landing gear 3a. The control processor 7 contains in particular, for each electric motor 6, an inverter 8 connected to the electric motor 6.

Figure 2:
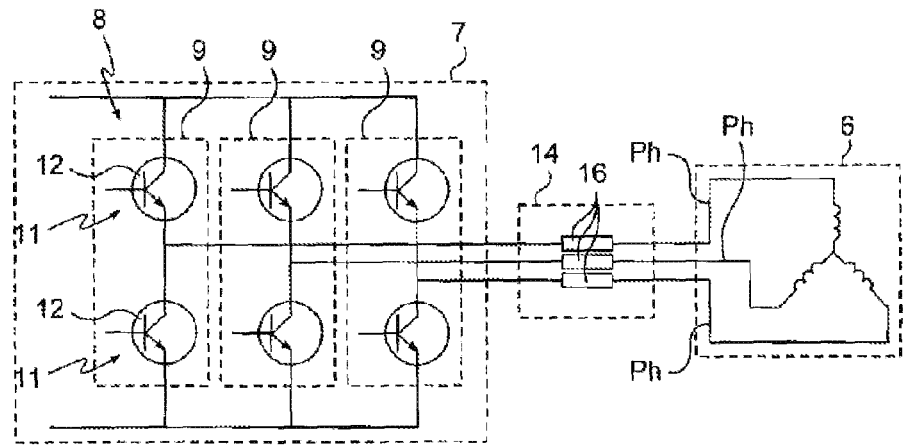
FIG. 2 shows an electric motor such as that described above, an inverter supplying power to this motor, and a switching member intended to mutually short-circuit the phases of the motor.

With reference to FIG. 2, each inverter 8 is intended to supply the associated electric motor 6 with a supply voltage such that the electric motor 6 rotationally drives the wheel 4 at a controlled speed of rotation and in a controlled direction of rotation. The inverter 8 conventionally comprises three switching cells 9 which are each connected to a phase Ph of the electric motor 6 and the phase-shifted commands of which allow a three-phase system of currents and voltages to be formed. Each switching cell 9 comprises two electric switches 11 each formed by a transistor 12 and a diode mounted parallel to the transistor and not visible in the figures.

The method for managing an electric motor according to the invention aims to protect the electric motor 6 in periods of deactivation of the electric motor during which it is envisaged not using the electric motor 6. These deactivation periods correspond here to the flight phases comprising take-off and landing. The information relating to the flight phase of the aircraft 1 is transmitted at each instant to the control processor 7. During these deactivation periods, for example during take-off where the aircraft speed is about 10 times higher than the speeds during taxiing, the ground speed of the aircraft 1 is considerable and therefore the electromotive force generated by the rotor of the electric motor 6 rotationally driven by the wheel 4 is potentially very high.

Protection of the electric motor 6 consists in short-circuiting the phases Ph of the electric motor 6 during these periods of deactivation of the motor so as to eliminate this electromotive force.

Two external switching members 14 are connected for this purpose between the control processor 7 and the electric motors 6 of the means 5 for driving the wheels 4 of the main train 3a. The input of each switching member 14 is connected to the output of one of the inverters 8 and the output of said member is connected to the three phases Ph of the electric motor 6 supplied by this inverter 8.

Figure 3:
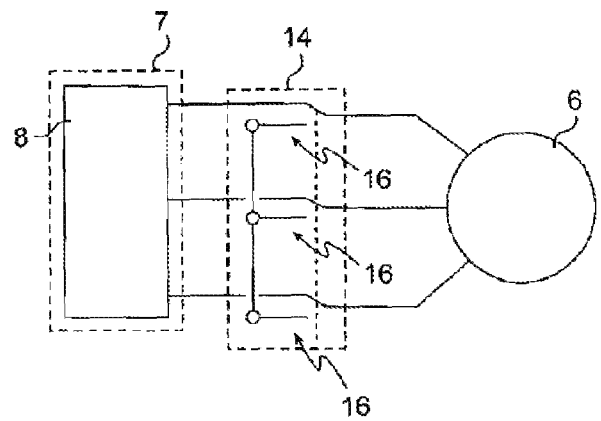
FIG. 3 shows the electric motor, the inverter and the switching member when the motor phases are not short-circuited.
Figure 4:
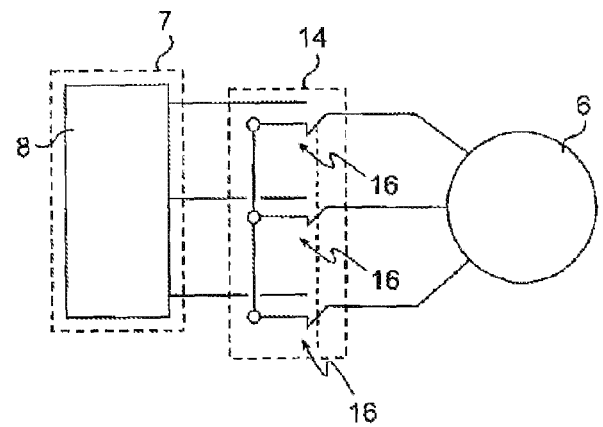
FIG. 4 shows the electric motor, the inverter and the switching member when the motor phases are short-circuited.

Each switching member 14 comprises three electromechanical switches 16 connected to the associated inverter 8 and to the three phases Ph of the electric motor 6, as shown in FIGS. 3 and 4. Each electromechanical switch 16 comprises an electromagnet and a contact. The electromagnets of the electromechanical switches 16 are controlled by the control processor 7 so as to operate selectively and simultaneously the contacts such that they assume a first state where each contact connects a switching cell 9 of the inverter 8 to a phase Ph of the motor 6 or a second state where the three phases Ph of the electric motor 6 are short-circuited.

FIGS. 3 and 4 illustrate respectively the state of the electromechanical switches 16 when the aircraft 1 is in an activation period during which it is envisaged using the electric motor 6 and in a deactivation period where it is envisaged not using the electric motor 6.

During the activation period, the electromechanical switches 16 are controlled by the control processor 7 so as to connect the switching cells 9 of the inverter 8 to the three phases Ph of the electric motor 6 which may then be normally driven.

During the deactivation period, the three phases Ph of the electric motor 6 are short-circuited and no electromotive force is generated within the electric motor 6 by the effect of rotation of the wheel 4.

Figure 5:
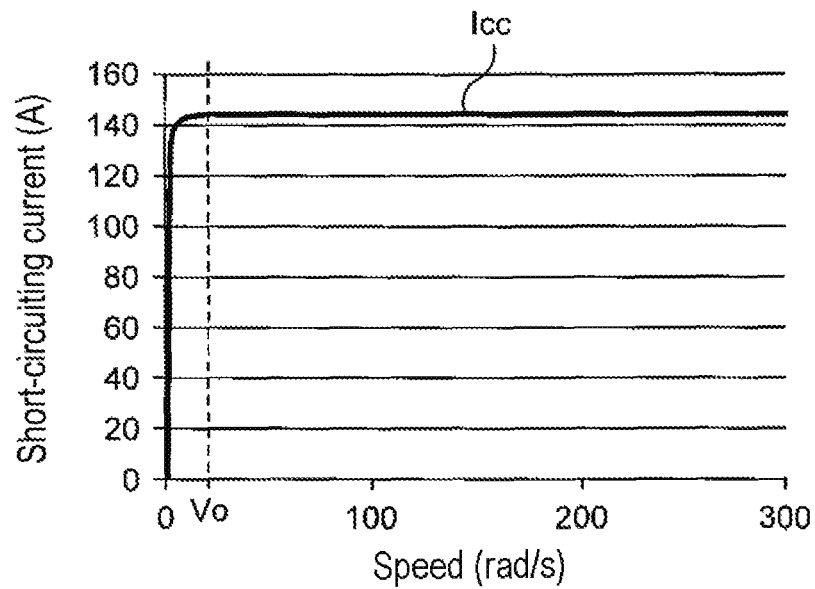
FIG. 5 is a graph showing a current for short-circuiting the electric motor as a function of the speed of rotation of the wheel.

It can be noted, with reference to FIG. 5, that the short-circuiting current Icc appearing in a motor such as the electric motor 6 is practically constant starting from a low speed-of-rotation value Vo of the wheel 4. The value of this short-circuiting current Icc is therefore relatively easy to foresee, thus making it possible to predict effectively the thermal impact of this short-circuiting current Icc on the electric motor 6 and any thermal protection systems which must be provided during the design of the electric motor 6.

Figure 6:
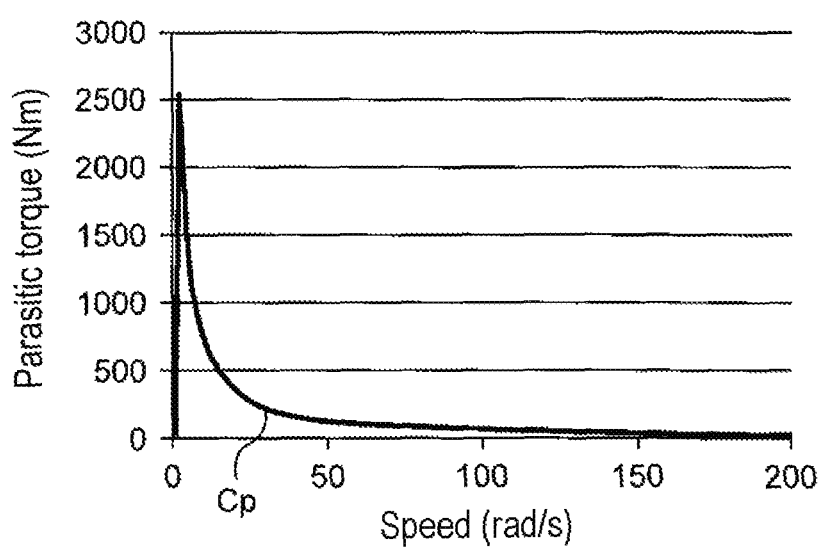
FIG. 6 is a graph showing a parasitic torque of the electric motor as a function of the speed of rotation of the wheel.

Moreover it can be noted, with reference to FIG. 6, that the parasitic torque Cp associated with the short-circuiting current Ic is maximum at a low speed and decreases very rapidly. During take-off this parasitic torque Cp increases by a small amount the rolling resistance of the aircraft 1 at low speed, which rapidly decreases and does not disturb take-off. During landing, the speed of rotation of the wheel 4 is very high when it touches the ground, the parasitic torque is very small and the rolling resistance does not disturb landing.

The invention is not limited to the particular mode of implementation described above, but, on the contrary, embraces all those variants which fall within the scope of the invention as defined by the claims.

Although a particular and simplified architecture of the system for rotational driving of the wheels has been used here to describe the invention, the method according to the invention is obviously applicable to any aircraft, at least one braked wheel of which is associated with an electric motor for rotationally driving the wheel.

It is moreover possible, in order to short-circuit the phases, to use instead of the electromechanical switches one or more electrical switches of the inverter 7 supplying the phases of the electric motor 6. The suppression of the electromechanical contactors 14 results in weight savings and an increased reliability of the system.

Although it has been stated here that the electric motor is a three-phase motor, the invention is applicable to motors provided with a different number of phases. The invention is applicable in particular to a single-phase motor, "short-circuiting of the phases" in a single-phase motor consisting in connecting together the two ends of the motor winding.

Although the deactivation periods of the motor have been indicated as being periods comprising take-off and landing, these deactivation periods may be of course differently defined. A deactivation period may thus comprise a period during which a speed of the aircraft is greater than a predetermined threshold speed. It is thus envisaged transmitting to the control processor measurements or estimates as to the speed of the aircraft instead of information relating to the flight phase of the aircraft. It can be noted that in the event of the taxiing function being unavailable, as a result for example of a malfunction of the aircraft system or a power supply failure, since the rest position of the electric motor management method corresponds to a short-circuited state, the impact on the behaviour of the aircraft is negligible.

The invention claimed is:

1. A method for managing an electric motor adapted to drive rotationally a wheel of an aircraft, the motor having phases (Ph) and adapted to being switched between periods of activation and deactivation, the method comprising:
   short-circuiting the phases (Ph) of the electric motor when the aircraft is in a period of deactivation of the motor during which it is envisaged not using the electric motor.

2. The method for managing an electric motor according to claim 1, wherein short-circuiting of the phases (pH) of the electric motor is performed by means of an electric switch of an inverter supplying a supply voltage to the electric motor.

3. The method for managing an electric motor according to claim 1, wherein short-circuiting of the phases (Ph) of the electric motor is performed by means of at least one electromechanical switch connected to the phases of the electric motor.

4. The method according to claim 1, wherein the deactivation period comprises a period during which a speed of the aircraft is greater than a predetermined speed threshold.

5. The method according to claim 1, wherein the deactivation period comprises a take-off phase and/or a landing phase of the aircraft.

* * * * *